US011195125B2

(12) United States Patent
Dong et al.

(10) Patent No.: US 11,195,125 B2
(45) Date of Patent: Dec. 7, 2021

(54) POLLUTION PREDICTION

(71) Applicant: International Business Machines Corporation, Armonk, NY (US)

(72) Inventors: Jin Dong, Beijing (CN); Liang Liu, Beijing (CN); Jun Mei Qu, Beijing (CN); Wei Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 15/139,548

(22) Filed: Apr. 27, 2016

(65) Prior Publication Data
US 2017/0316328 A1 Nov. 2, 2017

(51) Int. Cl.
*G06N 5/04* (2006.01)
*G06Q 10/06* (2012.01)
*G01W 1/10* (2006.01)
*G06Q 10/04* (2012.01)
*G06N 20/00* (2019.01)

(52) U.S. Cl.
CPC ............ *G06Q 10/063* (2013.01); *G01W 1/10* (2013.01); *G06N 20/00* (2019.01); *G06Q 10/04* (2013.01)

(58) Field of Classification Search
CPC .......... G06N 5/047; G06N 7/005; G06N 5/02; G06Q 30/0202; G06Q 10/04; G06Q 10/067
See application file for complete search history.

(56) References Cited

U.S. PATENT DOCUMENTS

| | | | |
|---|---|---|---|
| 6,611,726 B1* | 8/2003 | Crosswhite | G06F 19/00 700/99 |
| 8,190,367 B2 | 5/2012 | Bassa | |
| 9,947,202 B1* | 4/2018 | Moon et al. | G08B 21/10 |
| 2015/0032541 A1* | 1/2015 | Haddad et al. | G06Q 30/02 705/14.57 |
| 2016/0125307 A1* | 5/2016 | Zheng et al. | G06N 7/00 |

OTHER PUBLICATIONS

Ong et al., "Dynamically pre-trained deep recurrent neural networks using environmental monitoring data for predicting PM2.5" Neural Comput & Applic (2016) 27:1553-1566 published Jun. 26, 2015 (Year: 2015).*
Gilbo et al., "New Model to Improve Aggregate Air Traffic Demand Predictions," AIAA Guidance, Navigation and Control Conference and Exhibit, Aug. 20-23, 2007, Hilton Head, South Carolina (Year: 2007).*

(Continued)

*Primary Examiner* — Ann J Lo
*Assistant Examiner* — Scott R Gardner
(74) *Attorney, Agent, or Firm* — Scully, Scott, Murphy & Presser, PC; Joseph Petrokaitis, Esq.

(57) ABSTRACT

Embodiments of the present disclosure allow accuracy of prediction of pollution to be improved. In operation, a prediction of pollution in a future time period is determined. The prediction of pollution indicates predicted data related to a pollution index. Then, matching historical data for the predicted data is determined from historical data related to the pollution index. The matching historical data is obtained in a historical time period corresponding to the future time period. Based on the matching historical data, the prediction of pollution is refined.

11 Claims, 4 Drawing Sheets

(56) References Cited

OTHER PUBLICATIONS

Lopez et al., "Pollutants Time-Series Prediction Using The Gamma Classifier," International Journal of Computational Intelligence Systems, vol. 4, No. 4 (Jun. 2011), pp. 680-711 (Year: 2011).*

Gao et al., "Continually Evaluating Similarity-Based Pattern Queries on a Streaming Time Series," ACM SIGMOD Jun. 4-6, 2002, Madison, Wisconsin, USA (Year: 2002).*

Hosansky et al., "New NCAR Technique Slated to Improve Air Pollution Forecasts", AtomsNews; Mar. 11, 2015; http://www2.ucar/edu/atmosnews/in-brief/14623/heads-air-quality.

Anonymous, "Small Scale Air Pollution Forecast by Correlated Pollution Monitoring Stations and Forward Trajectory", IP.com, IPCOM000242506D, Jul. 21, 2015.

\* cited by examiner

POLLUTION PREDICTION

BACKGROUND

Pollution, such as air pollution, water pollution, soil pollution, and so on, is a world-wide problem. Human beings and our environment are directly and indirectly influenced by pollution. Considering air pollution as an example, it is an introduction of particulates, biological molecules, or other harmful materials into the atmosphere, and has a direct negative effect on the health of human bodies, plants, and animals. Indirectly, air pollution causes acid rain, global warming, and so on. To lessen the aforesaid predicaments, solutions of predicting and monitoring pollution have been paid more and more attention in recent years. Accurate prediction of pollution is very important to the public, industry enterprise and the government.

Traditional ways for predicting pollution simulate physical and chemical change of pollution by utilizing physical and chemical models such as Weather Research and Forecasting model coupled with Chemistry (WRF-chem), Comprehensive Air quality Model with extensions (CAMx), Community Multi-scale Air Quality (CMAQ). Generally, the accuracy of prediction heavily depends on data inputted to the models. For instance, volume, reliability and validity of input data, alone or in combination, may have a certain effect on the predicting results. In some cases, due to limited input data, the models would produce inaccurate predicting results of the pollution, which is undesirable.

SUMMARY

In one aspect, a computer-implemented method is proposed. According to the method, a prediction of pollution in a future time period is determined. The prediction of pollution indicates predicted data related to a pollution index. Then, matching historical data for the predicted data is determined from historical data related to the pollution index. The matching historical data is obtained in a historical time period corresponding to the future time period. Based on the matching historical data, the prediction of pollution is refined.

In another aspect, a device is proposed. The device includes one or more processors and a memory coupled to at least one of the processors. A set of computer program instructions are stored in the memory and executed by at least one of the processors in order to perform actions. The actions include obtaining a prediction of pollution in a future time period, the prediction of pollution indicating predicted data related to a pollution index; determining matching historical data for the predicted data from historical data related to the pollution index, the matching historical data being obtained in a historical time period corresponding to the future time period; and refining the prediction of pollution based on the matching historical data.

In yet another embodiment, a computer program product is proposed. The computer program product is tangibly stored on a non-transient machine readable medium and comprising executable instructions which, when executed on a device, cause the device to obtain a prediction of pollution in a future time period, the prediction of pollution indicating predicted data related to a pollution index; determine matching historical data for the predicted data from historical data related to the pollution index, the matching historical data being obtained in a historical time period corresponding to the future time period; and refine the prediction of pollution based on the matching historical data.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment."

The term "another embodiment" is to be read as "at least one other embodiment." Other definitions, explicit and implicit, may be included below.

Figure 1:
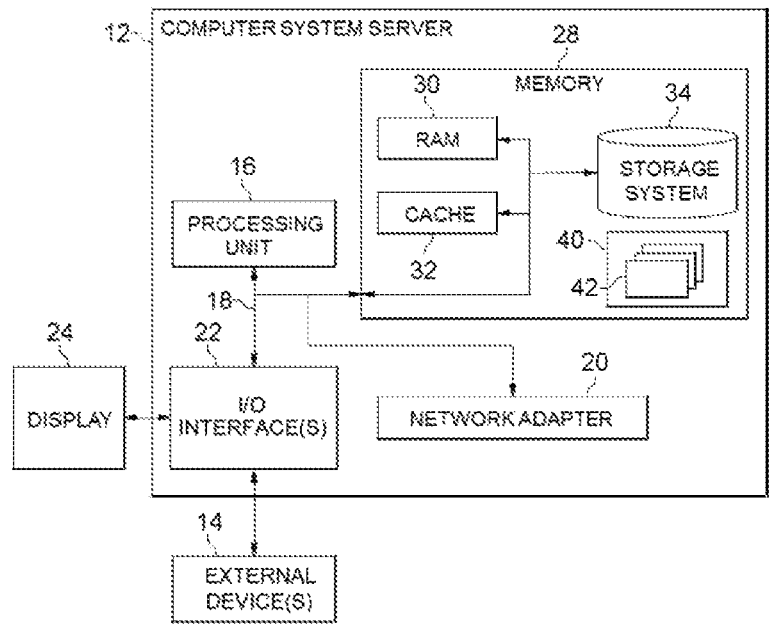
FIG. 1 is a block diagram of a device in which embodiments of the present disclosure can be implemented.

Reference is first made to FIG. 1, in which an exemplary device, referred to as computer system/server 12, which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

It is to be noted that the computer system/server 12 may be implemented as any suitable computing device, including but not limited to, a personal computer, a workstation, a mainframe, a midrange computer, a network appliance, a palm top computer, a telephony device, a blade computer, a hand held computer, and the like.

Figure 2:
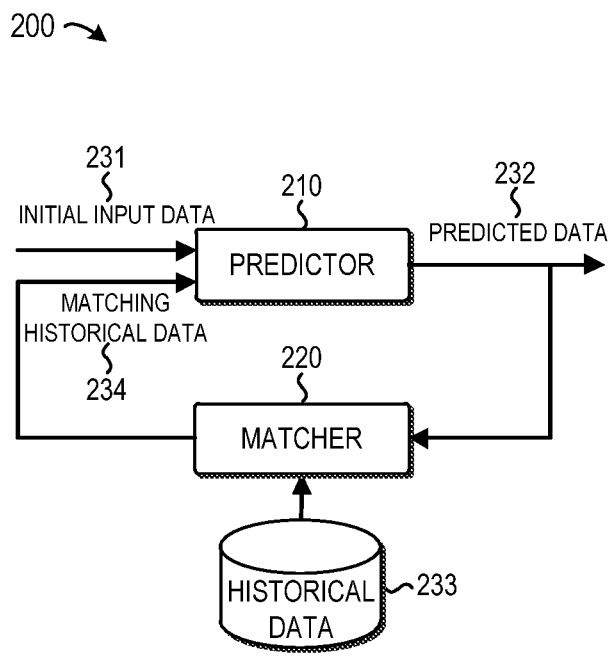
FIG. 2 is a schematic diagram of architecture of a pollution prediction system in which embodiments of the present disclosure can be implemented.

Now some example embodiments of the present disclosure will be described. FIG. 2 shows a schematic diagram of architecture of architecture of a pollution prediction system 200 in which embodiments of the present disclosure can be implemented. The pollution prediction system 200 may be implemented by the computer system as illustrated in FIG. 1, a networking system, or any other suitable computing system/device, either known at present or to be developed in the future.

It is to be understood that in the context of the disclosure, the term "pollution" may refers to any type of pollution including, but not limited to, air pollution, water pollution, soil pollution, and the like. By way of example, air pollution may be characterized by various pollution indices, such as PM (Particulate Matter) 2.5, PM 10, sulfur dioxide, nitrogen oxide, carbonic oxide, ozone, and any other suitable parameters. Although embodiments of the present disclosure are sometimes discussed hereafter with reference to air pollution, it is only for the purpose of illustration to help those skilled in the art to understand the present disclosure, without suggesting any limitations as to the scope of the disclosure. It would be appreciated that prediction of other kinds of pollution can be implemented by the pollution prediction system 200 and methods/devices for predicting pollution according to embodiments of the present disclosure as well.

Conventionally, a pollution prediction system utilizes a predictor to obtain prediction of pollution. The predictor is usually constructed based on a pollution predicting model such as WRF-chem, CAMx, CMAQ, and the like. The input data for the model primarily includes pollution inventory and measurement data obtained by one or more monitoring stations in a very short time period (for example, 1 or 2 hours) before the beginning of prediction. Due to the limited amount of input data, the results of prediction are generally inaccurate and unsatisfied. In order to address this and other potential problem, embodiments of the present disclosure provide a prediction solution taking more influence factors into account.

Specifically, in the example shown in FIG. 2, the pollution prediction system 200 comprises a predictor 210 and a matcher 220. The predictor 210 obtains the prediction of pollution in a future time period. This prediction can be considered as a primary prediction which is obtained from initial input data 231 by means of a variety of pollution predicting models, such as WRF-chem, CAMx, CMAQ, and so on. The prediction of pollution indicates predicted data 232 related to one or more pollution indices. The matcher 220 has access to a repository storing historical data 233. The historical data 233 includes data obtained by one or more monitoring stations in a past time period. To avoid valueless predictions, the historical data 233 used by the matcher 220 is related to the same pollution index as the predicted data 232. The matcher 220 selects historical data matching the predicted data. The selected matching historical data 234 is a part of historical data 233 that matches the predict data 232 and is obtained in a historical time period corresponding to the future time period. For example, if the future time period is of the length of ten hours, then the historical time period in which the matching historical data is obtained is also ten hours. Based on the matching historical data 234, the predictor 210 refines the prediction of pollution.

That is, in accordance with embodiments of the present disclosure, there are two stages of prediction in the pollution prediction system 200. The first stage generates a preliminary prediction based on the initial input data 231. The second stage generates a refined prediction which is obtained based on the matching historical data 234 as well as the initial input data 231. In this way, more data is taken into consideration and the accuracy of the prediction is improved.

It is to be understood that the configurations of FIG. 2 is described merely for the purpose of illustration, without suggesting any limitation as to the scope of the disclosure. Those skilled in the art will appreciate that various other configurations of components in the pollution prediction system 200 are contemplated.

Figure 3:
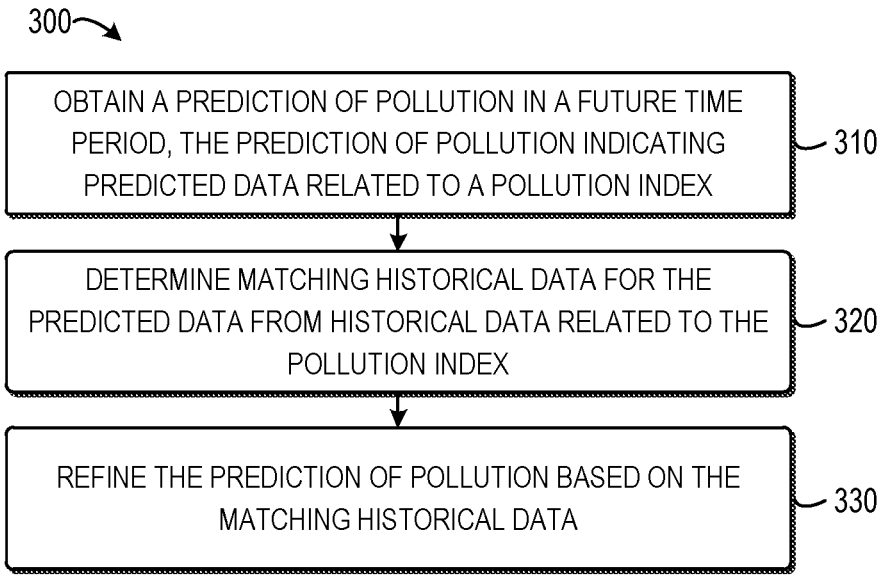
FIG. 3 is a flow chart of a method for predicting pollution in accordance with embodiments of the present disclosure.

Now some example embodiments of the present disclosure will be described. Reference is made to FIG. 3, which illustrates a method for predicting pollution in accordance with embodiments of the present disclosure. The method 300 may be at least in part implemented by the pollution prediction system 200, for example.

The method 300 is entered in step 310, where a prediction of pollution in a future time period is obtained. In accordance with embodiments of the present disclosure, the prediction of pollution may be obtained by means of various pollution predicting models, such as WRF-chem, CAMx, CMAQ, and so on. The prediction of pollution indicates predicted data 232 related to a pollution index, for example, but not limited to PM 2.5, PM 10, sulfur dioxide, nitrogen oxide, carbonic oxide, ozone, and the like. The predicted data 232 is the data that is predicted to be obtained by one or more monitoring stations in the future time period. The monitoring stations may locate in different geographical positions of a region such as a city or a district and are capable of measuring and recording data related to various pollution indices of pollution at these positions.

The future time period is a future period of time of a certain length such as 12 hours, 24 hours, 72 hours, or the like. The future time period may be divided into a plurality of time intervals. For example, if a time interval corresponds to an hour, the future time period of 72 hours includes 72 time intervals. In this case, the predicted data 232 may include 72 data records, each of which contains data predicted to be obtained by the monitoring stations in a respective hour. In this example, if there are 35 monitoring stations, each data record may include 35 data elements, each of which contains data obtained by a respective monitoring station. That is, each data record may be considered as a vector (which is a 35-dimensional vector in the above example.) In some embodiments, a data element may include only one data value of a pollution index, such as PM 2.5. In some alternative embodiments, a data element may include multiple data values of pollution indices, for example, four data values of PM 2.5, PM 10, sulfur dioxide, and nitrogen oxide.

In some embodiments, in step 310, the predicted data 232 may be calculated by the predictor 210 from the initial input data 231 based on a pollution predicting model. Alternatively, in some embodiments, the predicated data may be calculated by the predictor 210 in advance and stored in a storage device available to the matcher 220. Thus, in step 310, the matcher 220 may obtain the predicted data from the storage device to save time cost.

Next, in step 320, matching historical data for the predicted data is determined from historical data 233 related to the pollution index. As described above, the historical data 233 includes data obtained by one or more monitoring stations in a past time period, for example, last 7 days, last 3 months, or last 12 months. In an example, assuming the past time period corresponds to the last 7 days and the monitoring stations obtained the monitoring data per hour, the historical data may include multiple data records, each of the data records corresponding to the monitoring data obtained by the monitoring stations at an hour in the last 7 days. Generally speaking, the longer the past time period is, the more historical data are, and the possibility for obtaining the matching historical data is higher.

In accordance with embodiments of the present disclosure, the historical time period in which the matching historical data is obtained corresponds to the future time period. In some embodiments, it may have the same length as the future time period, for example, 12 hours, 24 hours, or 72 hours. Additionally, similar to the future time period, the historical time period may be divided into multiple time intervals. In some embodiments, the time intervals of the historical time period correspond to the time intervals of the predicted time period, respectively.

In accordance with embodiments of the present disclosure, the matching historical data may be determined in various ways. In some embodiments, the matcher 220 may obtain a candidate pattern of candidate historical data. As used herein, a pattern of data indicates a relationship of the data obtained by a plurality of monitoring stations. The candidate historical data may be a part of the historical data that is obtained by the monitoring stations in a period of time no shorter than the historical time period. Next, the matcher 220 may obtain a predicted pattern of the predicated data and determining a similarity between the predicted pattern and the candidate pattern. Then the matcher 220 may determine whether the candidate historical data is the matching historical data based on the similarity. More details will be discussed below with reference to embodiments of FIG. 4.

Alternatively, or in addition, the matcher 220 may determine the matching historical data according to inter-interval variations of the predicated data. For purpose of discussion, the time intervals of the future time period are referred to as "a first set of time intervals," and the time intervals of the historical time period are referred to as "a second set of time intervals." In an embodiment, the matcher 220 may determine a series of predicated inter-interval variations of the predicated data with respect to the first set of time intervals. Here an "inter-interval variation" refers to the difference of data across two adjacent time intervals, which will be discussed in detail in the following paragraphs. Next, the matcher 220 may select, from the historical data, a series of historical inter-interval variations with respect to the second set of time intervals in such a way that the selected historical inter-interval variations match the predicated inter-interval variations, respectively. The time intervals of the first set correspond to the time intervals of the second set, respectively. For example, the $l^{th}$ time interval in the second set may has the same length as the $l^{th}$ time interval in the first set, wherein l=1, 2, . . . , L, and L represents the size of the first set. Then, the matcher 220 may determine the matching historical data based on the selected series of historical inter-interval variations. More details will be discussed below with reference to embodiments of FIG. 6.

In step 330, the prediction of pollution is refined based on the matching historical data 234. According to embodiments of the present disclosure, the predictor 210 may perform pollution prediction by using the matching historical data 234, alone or in combination with the initial input data 231. Since the matching historical data 234 represents a part of the historical data that is similar to the predicted data 232, the input data to the matcher 220 can be expanded. In this way, the accuracy of the prediction can be improved.

Figure 4:
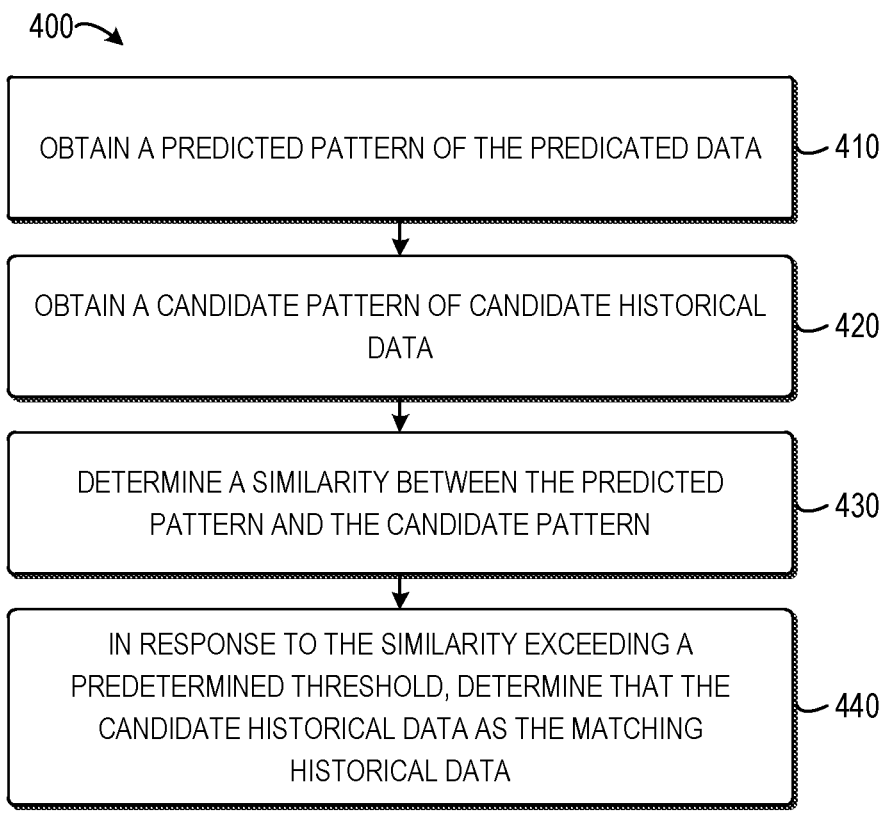
FIG. 4 is a flow chart of a method for determining matching historical data in accordance with embodiments of the present disclosure.

Now some example embodiments of determination of the matching historical data will be described. FIG. 4 is a flow chart of a method 400 for determining matching historical data in accordance with embodiments of the present disclosure. The method 400 can be considered as an implementation of step 320 of the method 300. It is to be understood that the step 320 of the method 300 may be implemented in several ways as discussed above, and the method 400 is only one example instead of limitation.

The method 400 is entered in step 410, where a predicted pattern of the predicated data is obtained. According to embodiments of the present disclosure, both the predicted data and the historical data are associated with a plurality of monitoring stations. In an example, assuming that there are 35 monitoring stations and the future time period is 12 hours, the predicted data indicates data predicted to be obtained by the 35 monitoring stations in the upcoming 12 hours, and the historical data indicates data obtained by the 35 monitoring stations in a past time period. In some embodiments, the past time period is longer than the future time period, for example. In some other embodiments, it is possible to use the past time period that is equal to the future time period.

The predicted pattern may be obtained in various ways. In some embodiments, the predicated data may be sorted according to values of the data predicted to be obtained by the plurality of monitoring stations within one or more time intervals of the future time period. If the only one time interval is taken into consideration, the predicated data that is predicted to be obtained by the plurality of monitoring stations in that time interval is sorted. If multiple time intervals are considered, the predicated data that is predicted to be obtained within those time intervals may be averaged and then sorted. Associations of the plurality of monitoring stations may be determined based on the sorted predicated data. Then, the predicted pattern may be based on the associations.

Figure 5A:
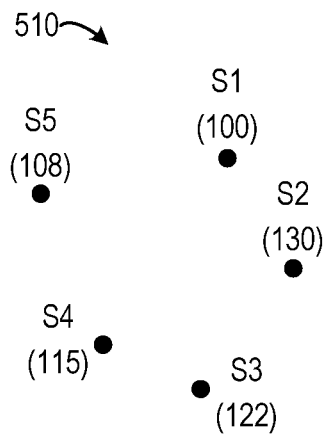
FIG. 5A is a schematic diagram of predicted data and associated monitoring stations in accordance with embodiments of the present disclosure.
Figure 5B:
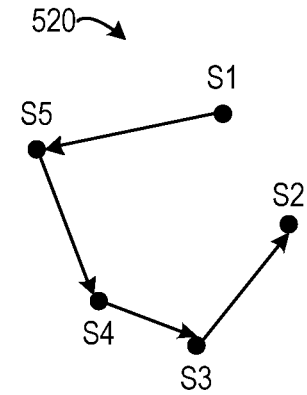
FIG. 5B is a schematic diagram of a predicted pattern in accordance with embodiments of the present disclosure.

FIG. 5A illustrates a schematic diagram 510 of predicted data and associated monitoring stations in accordance with embodiments of the present disclosure. As shown, the monitoring stations S1 to S5 are located in different positions and obtain data related to a pollution index (for example, density of PM 2.5) within a time interval of 1 hour. In the example, it is supposed that the future time period is 72 hours and a data record of data predicted to be obtained by 5 monitoring stations, S1 to S5, at a certain hour of the future 72 hours comprises data elements whose values are 100, 130, 122, 115 and 108, respectively. According to an ascending order, the data elements may be sorted as 100→108→115→122→130. Then the associations of the monitoring stations S1 to S5 may be determined based on the sorting results. In this example, since the data element 100 corresponding to the monitoring station S1 is immediately adjacent to the data element 108 corresponding to the monitoring station S5, it may be determined that S1 is associated with S5. For purpose of discussion, the association of S1 and S5 is denoted as a directional edge from S1 to S5 Likewise, in this example, it may be determined that S5 is associated with S4, S4 is associated with S3, and S3 is associated with S2, and the associations may be denoted as the respective directional edges. Then the predicted pattern may be obtained based the associations of the monitoring stations S1 to S5. FIG. 5B shows a schematic diagram of the resulting predicted pattern 520. It can be seen, the associations of monitoring stations can be represented as a directional graph.

It is to be understood that although the predicted pattern 520 may be represented as a graph in the embodiments of FIG. 5B, it is described only for the purpose of illustration to help those skilled in the art to understand the present disclosure, without suggesting any limitations as to the scope of the disclosure. It would be appreciated that the predicted pattern may be implemented in various ways. In some embodiment, the predicted pattern 520 may be represented by a matrix, which has M rows and M columns, M representing the total number of the monitoring stations. Elements of the matrix may be set as predetermined values, for example, +1, −1 and 0, to indicate the associations of the monitoring stations.

Still in reference to FIG. 4, in step 420, a candidate pattern of candidate historical data is obtained. According to embodiments of the present disclosure, the candidate historical data is a part of the historical data. In some embodiments, the candidate historical data may be determined from the historical data according to the sorting of the predicted data. For example, the candidate historical data may be the historical data that is obtained in a historical time period corresponding to the future time period. Similar to the predicated data, the candidate historical data may be sorted according to values of data obtained by monitoring stations at a set of time intervals of the historical time period. Associations of the plurality of monitoring stations may be determined based on the sorted candidate historical data. Then, the candidate pattern may be based on the determined associations.

Figure 5C:
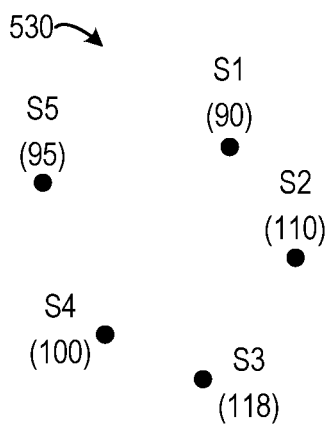
FIG. 5C is a schematic diagram of candidate historical data and the associated monitoring stations in accordance with embodiments of the present disclosure.
Figure 5D:
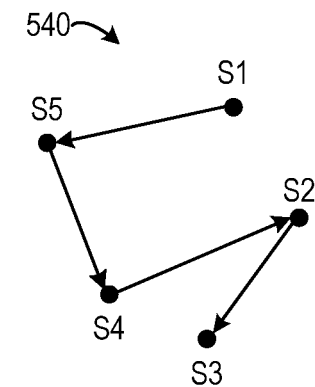
FIG. 5D is a schematic diagram of a candidate pattern in accordance with embodiments of the present disclosure.

FIG. 5C is a schematic diagram 530 of candidate historical data and the associated monitoring stations S1 to S5 in accordance with embodiments of the present disclosure. In the example, it is supposed that a data record of candidate historical data obtained by the monitoring stations S1 to S5 during 12:00 to 13:00 on Dec. 1, 2015 (also referred to as "first candidate historical data") comprises data elements whose values are 90, 110, 118, 100 and 95, respectively. According to an ascending order, the data elements may be sorted as 100→108→115→122→130. Thus, associations of the monitoring stations S1 to S5 may be determined based on the sorting results as S1→S5, S5→S4, S4→S2 and S2→S3. FIG. 5D illustrates a schematic diagram of the candidate pattern 540 determined according to embodiments of FIG. 5C.

Figure 5E:
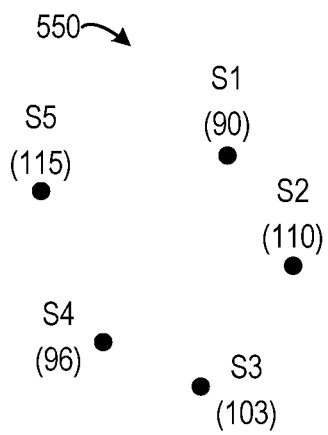
FIG. 5E is a schematic diagram of candidate historical data and the associated monitoring stations in accordance with further embodiments of the present disclosure.
Figure 5F:
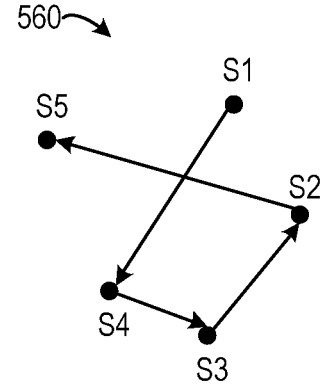
FIG. 5F is a schematic diagram of a candidate pattern in accordance with further embodiments of the present disclosure.

FIG. 5E is another schematic diagram 550 of candidate historical data and the associated monitoring stations S1 to S5 in accordance with embodiments of the present disclosure. In the example, it is supposed that a data record of candidate historical data obtained by the monitoring stations S1 to S5 during 9:00 to 10:00 on Dec. 5, 2015 (also referred to as "first candidate historical data") comprises data elements whose values are 90, 110, 103, 96 and 115, respectively. According to an ascending order, the data elements may be sorted as 90→96→103→110→115. Thus, associations of the monitoring stations S1 to S5 may be determined based on the sorting results as S1→S4, S4→S3, S3→S2 and S2→S5. FIG. 5F illustrates a schematic diagram of the candidate pattern 560 determined according to embodiments of FIG. 5E.

Still in reference to FIG. 4, in step 430, a similarity between the predicted pattern and the candidate pattern is determined. In some embodiments, the predicted pattern may be represented by a first matrix and the candidate pattern may be represented by a second matrix. By calculating the similarity of the first matrix and the second matrix, the similarity between the predicted pattern and the candidate pattern can be determined.

It is to be understood that the above embodiments for determining the similarity is are described only for the purpose of illustration to help those skilled in the art to understand the present disclosure, without suggesting any limitations as to the scope of the disclosure. It would be appreciated that the similarity may be implemented in a variety of ways, which are not detailed here to avoid obscure.

In step 440, in response to the similarity exceeding a predetermined threshold, the candidate historical data is determined as the matching historical data. In some embodiments, different candidate historical data can be determined from the historical data according to different time intervals at which the candidate historical data is obtained. For example, assuming that the predetermined threshold is 50%, if the similarity between the predicted pattern 520 and the candidate pattern 540 is larger than 50%, it may be determined that the first candidate historical data are the matching historical data. It is to be understood that the threshold value is not limited to 50% but can be set to any suitable value.

Optionally, in some embodiments, the predicted data and the candidate historical data may be preprocessed before determining the predicted pattern and the candidate pattern, so as to reduce computation cost. In an embodiment, the monitoring stations may be grouped, and the predicted data and the candidate historical data may be determined based on the grouping of the monitoring stations. For example, it is supposed that there are 35 monitoring stations and they are grouped into 5 groups, each group including 7 monitoring stations. For each group of monitoring stations, the predicated data associated with the group may be determined by determining an average, a median, a weighted average, the maximum, the minimum or the like of data predicated to be obtained by the 7 monitoring stations. The candidate data associated with each group of monitoring stations may be determined in a similar way. As such, the predicted pattern that could have 35 nodes and 34 edges may be reduced as a new predicted pattern that has 5 nodes and 4 edges, and the candidate pattern can be reduced similarly. In this way, calculation cost can be effectively reduced.

Figure 6:
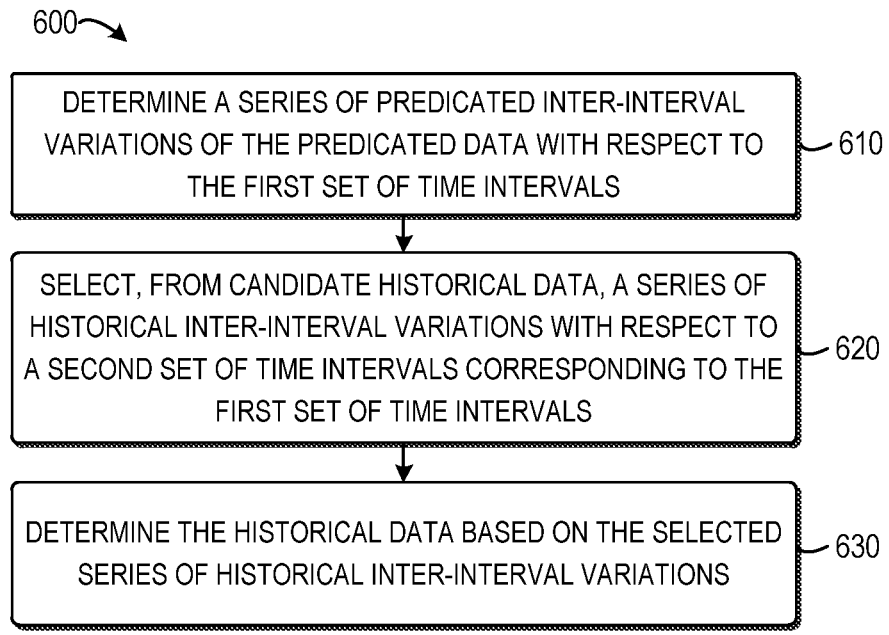
FIG. 6 is a flow chart of a method for determining matching historical data in accordance with further embodiments of the present disclosure.

Reference is now made to FIG. 6, which illustrates a flow chart of a method 600 for determining matching historical data in accordance with further embodiments of the present disclosure. The method 600 can be considered as another implementation of step 320 of the method 300. It is to be understood that the step 320 of the method 300 may be implemented in several ways as discussed above, and the method 600, like the method 400, is only one example instead of limitation.

For purpose of discussion, in the following discussions, the time intervals included in the future time period are referred to as a first set of time intervals. The method 600 is entered in step 610, where a series of predicated inter-interval variations of the predicated data is determined with respect to the first set of time intervals. The predicated inter-interval variation indicates a variation of the predicated data between each pair of adjacent time intervals of the first set.

In some embodiments, the predicated data predicted to be obtained by one or more monitoring stations in a time interval (referred to as a "first time interval") may be collectively referred to as a first data record, and the predicated data predicted to be obtained by the monitoring stations in another time interval (referred to as a "second time interval") may be collectively referred to as a second data record. Each of the first and second data record may comprise one or more data elements corresponding to the one or more monitoring stations. With respect to the first and second time intervals, which constitute a pair of adjacent time intervals, a predicated inter-interval variation may be obtained, for example, by calculating the variation between the first and second data records. The calculated variation may be represented as a new data record comprising one or more variation elements corresponding to the one or more monitoring stations.

In an example, it is supposed that the first data record is {100, 130, 122, 115, 108} which represents the predicated data predicted to be obtained by monitoring stations S1 to S5 at 09:00-10:00 of Dec. 1, 2015, and the second data record is {115, 125, 130, 126, 120} which represents the predicated data predicted to be obtained by the monitoring stations S1 to S5 at 10:00-11:00 of Dec. 1, 2015. Thus, the predicated inter-interval variation can be determined as {15, −5, 8, 11, 12}. In this way, if the predicted data corresponds to the future time period of 12 hours, for example, from 09:00 to 21:00 of Dec. 1, 2015, it is possible to determine 11 predicated inter-interval variations. Furthermore, the 11 predicated inter-interval variations may be arranged as a series of predicated inter-interval variations according to their associated time intervals.

In step 620, a series of historical inter-interval variations is selected, from the historical data, with respect to a second set of time intervals corresponding to the first set of time intervals. The second set of time intervals may include one or more time intervals, each having the same length as a time interval of the first set. The selected historical inter-interval variations may match the predicated inter-interval variations, respectively.

The series of historical inter-interval variations may be selected in a variety of ways. In some embodiments, it may be determined, from the historical data, a set of candidate historical inter-interval variations that match one (referred to as a first predicated inter-interval variation) of the predicated inter-interval variations determined in step 610. The determined set may include one or more candidate historical inter-interval variations, each of which is similar to the first predicated inter-interval variation. Then, a candidate historical inter-interval variation may be selected from the set of candidate historical inter-interval variations as one of the series of historical inter-interval variations.

A candidate historical inter-interval variation of the set of candidate historical inter-interval variations may be determined from the historical data for the first predicated inter-interval variation in various ways. In an embodiment, the historical data obtained by one or more monitoring stations in a time interval (referred to as a "third time interval") may be collectively referred to as a third data record, and the historical data obtained by the monitoring stations in another time interval (referred to as a "fourth time interval") may be collectively referred to as a fourth data record. An inter-interval variation may be thus determined by calculating the variation between the third and fourth data records. Then, the similarity between the determined inter-interval variation and the first predicated inter-interval variation may be determined, for example, by calculating the cosine similarity, the Euclidean distance, the Mahalanobis distance, and the like. Alternatively, in some embodiments, it may be determined a first pattern of the determined inter-interval variation and a second pattern of the first predicated inter-interval variation, for example, in a similar way as discussed in steps 410 and 420. Then, the similarly between the first pattern and the second pattern may be determined. If the similarity exceeds a predetermined threshold, the determined inter-interval variation may be determined as a candidate historical inter-interval variation matching the first predicated inter-interval variation.

In an example, assuming that there are K predicated inter-interval variations determined in step 610, there are K sets of candidate historical inter-interval variations may be determined in step 620. The number of candidate historical inter-interval variations in the $k^{th}$ set may be denoted as $C_k$, wherein k=1, 2, . . . , K. Thus, a candidate historical inter-interval variation may be selected from the $k^{th}$ set as the $k^{th}$ historical inter-interval variation of the series of historical inter-interval variations, as long as the time intervals associated with the selected candidate historical inter-interval variation are not subsequent to the time intervals associated with the $(k+1)^{th}$ historical inter-interval variation and not prior to the time intervals associated with the $(k-1)^{th}$ historical inter-interval variation.

Figure 7:
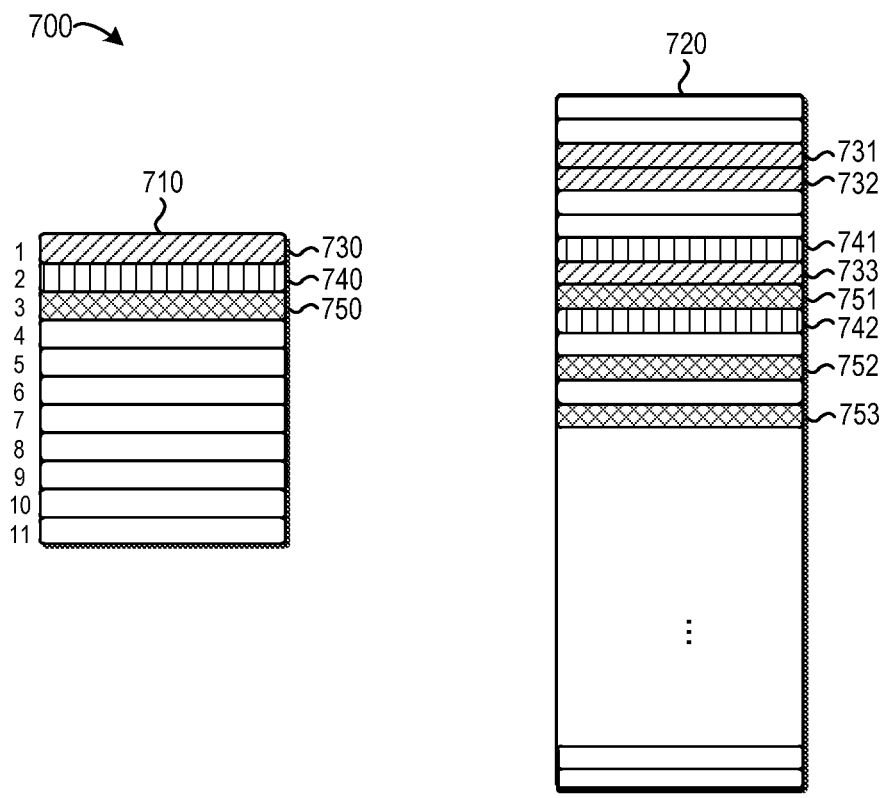
FIG. 7 is a schematic diagram of selecting a series of historical inter-interval variations matching a series of predicated inter-interval variations in accordance with embodiments of the present disclosure.

FIG. 7 is a schematic diagram of selecting a series of historical inter-interval variations matching a series of predicated inter-interval variations in accordance with embodiments of the present disclosure. In the example of FIG. 7, there are a series of predicated inter-interval variations 710, which includes 11 predicated inter-interval variations arranged according to their associated time intervals. The example of FIG. 7 also shows a group of inter inter-interval variations 720 determined from the historical data, which are arranged according to their associated time intervals, as well. As shown in FIG. 7, with respect to the predicated inter-interval variation 730, a first set of candidate historical inter-interval variations 731, 732 and 733 are determined from the group of inter inter-interval variations 720. With respect to the predicated inter-interval variation 740, a second set of candidate historical inter-interval variations 741 and 742 are determined from the group of inter inter-interval variations 720. With respect to the predicated inter-interval variation 750, a third set of candidate historical inter-interval variations 751, 752, and 753 are determined from the group of inter inter-interval variations 720.

In determining the historical inter-interval variations matching the first predicated inter-interval variations 730 and 740, since the time interval associated with the predicated inter-interval variations 730 is prior to the time interval associated with the predicated inter-interval variations 740 (that is, the predicated inter-interval variations 730 is prior to the predicated inter-interval variations 740), the time interval associated with the historical inter-interval variation (referred to as the first historical inter-interval variation) matching the first predicated inter-interval variation 730 should be prior to the time interval associated with the historical inter-interval variation (referred to as the second historical inter-interval variation) matching associated with the second predicated inter-interval variations 740.

As shown in FIG. 7, if the candidate historical inter-interval variation 731 is determined as the first historical inter-interval variation, both the candidate historical inter-interval variations 741 and 742 may be determined as the second historical inter-interval variation. In the case that the candidate historical inter-interval variation 742 is determined as the second historical inter-interval variation, since the candidate historical inter-interval variation 751 is prior to the candidate historical inter-interval variation 742, the candidate historical inter-interval variation 751 cannot be determined as the third historical inter-interval variation matching the third predicated inter-interval variations 750. In this event, either the candidate historical inter-interval variation 752 or 753 may be determined as the third historical inter-interval variation since they are both subsequent to the candidate historical inter-interval variation 742. In this way, it is possible to determine the series of historical inter-interval variations. The total number of the historical inter-interval variations in the series is the same as the total number of predicated inter-interval variations, namely, 11.

In an alternative embodiment, assuming the candidate historical inter-interval variation 742 is determined as the second historical inter-interval variation, if all the candidate historical inter-interval variations 751, 752 and 753 are prior to the candidate historical inter-interval variation 742, none of the candidate historical inter-interval variations 751, 752 and 753 can be determined as the third historical inter-interval variation matching the third predicated inter-interval variations 750. In this event, a portion of the 11 predicated inter-interval variations (for example, the predicated inter-interval variations 730 and 740) may be used in the selection of the series of historical inter-interval variations in step 620. The series of historical inter-interval variations may thus include the first historical inter-interval variation 731 (also can be 732 or 733), and the second historical inter-interval variation 742. In this case, the total number of the historical inter-interval variations in the series is the same as the total number of predicated inter-interval variations used in step 620, namely 2.

Still in reference to FIG. 6, in step 630, the matching historical data is determined based on the selected series of historical inter-interval variations. There may be several ways to determine the matching historical data based on the series of historical inter-interval variations determined in step 620. In some embodiments, time intervals (referred to as "target historical time intervals") associated with each of the series of historical inter-interval variations may be determined. Then, the historical data obtained by the monitoring stations in the target historical time intervals may be obtained as the matching historical data. In this way, the input data for prediction of pollution is expanded and the accuracy of the prediction is improved.

The methods 300, 400 and/or 600 may be implemented by computer programs. For example, the computer programs, when executed by a processor on a device (such as the computer system 12 shown in FIG. 1, or one or more cloud computing nodes (not shown), may be loaded into the memory and cause the device to implement the method 300, 400 and/or 600.

The present disclosure may be a method, a device, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, a SRAM, a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored on a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
receiving, from a plurality of air pollution monitoring stations, air quality data used for predicting air pollution in a future time period at respective locations associated with a plurality of air pollution monitoring stations;
running, at a hardware processor of a computer, a pollution predicting model to obtain a prediction of pollution in the future time period, the prediction of pollution indicating predicted data related to a pollution index determined at each respective location;
determining, at the hardware processor, matching historical data for the predicted data from historical data related to the pollution index determined in the past at said respective locations associated with the plurality of air pollution monitoring stations, the matching historical data being obtained in a historical time period corresponding to the future time period wherein the future time period includes a first set of time intervals, said determining the matching historical data comprising:
determining a predicted pattern of the predicted data, the predicted pattern including a series of predicted inter-interval variations of the predicted data with respect to the first set of time intervals, the series determined by calculating, as one of the predicted inter-interval variations, a variation of the predicted data between each pair of adjacent time intervals of the first set;
selecting, by the hardware processor, from the historical data, a series of historical inter-interval variations with respect to a second set of time intervals corresponding to the first set of time intervals, the selected historical inter-interval variations matching the predicted inter-interval variations, respectively;
determining the matching historical data based on the selected series of historical inter-interval variations;
running, at said hardware processor, said pollution predicting model based on said determined matched historical data to refine the prediction of pollution based on the matching historical data, and wherein the determining the matching historical data further comprises:
obtaining the predicted pattern of the predicted data, a pattern indicating a relationship of predicted data values obtained from among the plurality of monitoring stations, said predicted pattern obtained by:
sorting the predicted data according to an ascending order of the predicted data values;
determining associations of the plurality of monitoring stations based on the sorted predicted data, the predicted pattern based upon the determined associations;
obtaining a candidate pattern of candidate historical data values, the candidate historical data values being a part of the historical data, said candidate pattern obtained by:
sorting the candidate historical data values according to an ascending order of the candidate historical data values;
determining associations of the plurality of monitoring stations based on the sorted candidate historical data, the candidate pattern based upon the determined associations;
determining a similarity between the predicted pattern and the candidate pattern; and
in response to the similarity exceeding a predetermined threshold, determining the candidate historical data as the matching historical data.

2. The method of claim 1, further comprising:
grouping the plurality of monitoring stations; and
determining the predicted data and the candidate historical data based on the grouping of the plurality of monitoring stations.

3. The method of claim 1, wherein selecting the series of historical inter-interval variations comprises:
determining, from the historical data, a set of candidate historical inter-interval variations matching one of the predicted inter-interval variations; and
selecting, as one of the series of historical inter-interval variations, a candidate historical inter-interval variation from the set of candidate historical inter-interval variations based on time intervals associated with the candidate historical inter-interval variation.

4. The method of claim 1, wherein said determining a similarity between the predicted pattern and the candidate pattern further comprises:
representing said predicted pattern by a first matrix;
representing said candidate pattern by a second matrix; and
calculating a similarity between the first matrix and the second matrix.

5. A device for pollution prediction, comprising:
one or more processors;
a memory coupled to at least one of the processors;
a set of computer program instructions stored in the memory and executed by at least one of the processors in order to perform actions including:
receiving, from a plurality of air pollution monitoring stations, air quality data used for predicting air pollution in a future time period at respective locations associated with a plurality of air pollution monitoring stations;
running a pollution predicting model to obtain a prediction of pollution in the future time period, the prediction of pollution indicating predicted data related to a pollution index determined at each respective location;
determining matching historical data for the predicted data from historical data related to the pollution index determined in the past at said respective locations associated with the plurality of air pollution monitoring stations, the matching historical data being obtained in a historical time period corresponding to the future time period, wherein the future time period includes a first set of time intervals, said determining the matching historical data comprising:
determining a predicted pattern of the predicted data, the predicted pattern including a series of predicted inter-interval variations of the predicted data with respect to the first set of time intervals, the series determined by calculating, as one of the predicted inter-interval variations, a variation of the predicted data between each pair of adjacent time intervals of the first set;

selecting, by the hardware processor, from the historical data, a series of historical inter-interval variations with respect to a second set of time intervals corresponding to the first set of time intervals, the selected historical inter-interval variations matching the predicted inter-interval variations, respectively;

determining the matching historical data based on the selected series of historical inter-interval variations;

running said pollution predicting model based on said determined matched historical data to refine the prediction of pollution based on the matching historical data, and wherein the determining of the matching historical data further comprises:

obtaining the predicted pattern of the predicted data, a pattern indicating a relationship of predicted data values obtained from among the plurality of monitoring stations, said predicted pattern obtained by:

sorting the predicted data according to an ascending order of the predicted data values;

determining associations of the plurality of monitoring stations based on the sorted predicted data, the predicted pattern based upon the determined associations;

obtaining a candidate pattern of candidate historical data values, the candidate historical data values being a part of the historical data, said candidate pattern obtained by:

sorting the candidate historical data according to an ascending order of the candidate historical data values;

determining associations of the plurality of monitoring stations based on the sorted candidate historical data, the candidate pattern based upon the determined associations;

determining a similarity between the predicted pattern and the candidate pattern; and in response to the similarity exceeding a predetermined threshold, determining the candidate historical data as the matching historical data.

6. The device of claim 5, wherein the actions further include:

grouping the plurality of monitoring stations; and determining the predicted data and the candidate historical data based on the grouping of the plurality of monitoring stations.

7. The device of claim 5, wherein the actions further include:

determining, from the historical data, a set of candidate historical inter-interval variations matching one of the predicted inter-interval variations; and selecting, as one of the series of historical inter-interval variations, a candidate historical inter-interval variation from the set of candidate historical inter-interval variations based on time intervals associated with the candidate historical inter-interval variation.

8. The device of claim 5, wherein for said determining a similarity between the predicted pattern and the candidate pattern, the actions executed by at least one of the processors further comprise:

representing said predicted pattern by a first matrix;

representing said candidate pattern by a second matrix; and calculating a similarity between the first matrix and the second matrix.

9. A computer program product being tangibly stored on a non-transient machine-readable medium and comprising machine-executable instructions, the instructions, when executed by a device, causing the device to:

run a pollution predicting model to obtain a prediction of pollution in a future time period, the prediction of pollution indicating predicted data related to a pollution index determined at locations associated with a plurality of air pollution monitoring stations providing air quality data used for predicting air pollution;

determine matching historical data for the predicted data from historical data related to the pollution index determined in the past at said respective locations associated with the plurality of air pollution monitoring stations, the matching historical data being obtained in a historical time period corresponding to the future time period, wherein the future time period includes a first set of time intervals, wherein to determine the matching historical data, the device is further caused to:

determine a predicted pattern of the predicted data, the predicted pattern including a series of predicted inter-interval variations of the predicated data with respect to the first set of time intervals, the series determined by calculating, as one of the predicated inter-interval variations, a variation of the predicted data between each pair of adjacent time intervals of the first set;

select from the historical data, a series of historical inter-interval variations with respect to a second set of time intervals corresponding to the first set of time intervals, the selected historical inter-interval variations matching the predicted inter-interval variations, respectively;

determine the matching historical data based on the selected series of historical inter-interval variations; and run said pollution predicting model based on said determined matched historical data to refine the prediction of pollution based on the matching historical data, wherein the predicted data and the historical data are associated with a plurality of monitoring stations, and wherein the instructions further cause the device to:

obtain the predicted pattern of the predicted data, a pattern indicating a relationship of predicted data values obtained from among the plurality of monitoring stations, said predicted pattern obtained by:

sorting the predicted data according to an ascending order of the predicted data values;

determining associations of the plurality of monitoring stations based on the sorted predicted data, the predicted pattern based upon the determined associations;

obtain a candidate pattern of candidate historical data values, the candidate historical data values being a part of the historical data, said candidate pattern obtained by:

sorting the candidate historical data according to an ascending order of the candidate historical data values;

determining associations of the plurality of monitoring stations based on the sorted candidate historical data, the candidate pattern based upon the determined associations;

determine a similarity between the predicted pattern and the candidate pattern; and in response to the similarity exceeding a predetermined threshold, determine the candidate historical data as the matching historical data.

10. The computer program product of claim 9, wherein the instructions further cause the device to:

group the plurality of monitoring stations; and determine the predicted data and the candidate historical data based on the grouping of the plurality of monitoring stations.

11. The computer program product of claim 9, wherein the instructions further cause the device to:

represent said predicted pattern by a first matrix;

represent said candidate pattern by a second matrix; and calculate a similarity between the first matrix and the second matrix.

\* \* \* \* \*